(12) United States Patent
Kaku et al.

(10) Patent No.: US 6,252,369 B1
(45) Date of Patent: Jun. 26, 2001

(54) MOTOR SPEED CONTROLLER AND GAIN SETTING METHOD OF THE CONTROLLER

(75) Inventors: Yasuhiko Kaku; Takashi Kitazawa; Tadashi Okubo, all of Kitakyushu (JP)

(73) Assignee: Kabushiki Kaisha Yaskawa Denki, Kitakyushi (JP)

( * ) Notice: Subject to any disclaimer, the term of this patent is extended or adjusted under 35 U.S.C. 154(b) by 0 days.

(21) Appl. No.: 09/530,036
(22) PCT Filed: Oct. 15, 1998
(86) PCT No.: PCT/JP98/04694
§ 371 Date: Apr. 24, 2000
§ 102(e) Date: Apr. 24, 2000
(87) PCT Pub. No.: WO99/22441
PCT Pub. Date: May 6, 1999

(30) Foreign Application Priority Data

Oct. 24, 1997 (JP) .................................................. 9-292883

(51) Int. Cl.⁷ .................................................. G05B 11/36
(52) U.S. Cl. .......................... 318/609; 318/621; 318/610; 388/906
(58) Field of Search .................................. 318/432, 255, 318/268, 445, 485, 621, 632, 568.22, 609, 610; 388/906

(56) References Cited

U.S. PATENT DOCUMENTS

| | | | |
|---|---|---|---|
| 4,733,149 | * 3/1988 | Culberson | 318/561 |
| 4,821,168 | * 4/1989 | Gotou | 364/183 |
| 5,223,778 | * 6/1993 | Svarovsky et al. | 318/610 |
| 5,384,526 | * 1/1995 | Bennett | 318/611 |
| 5,726,879 | * 3/1998 | Sato | 365/167.01 |
| 5,737,483 | * 4/1998 | Inaji et al. | 388/805 |
| 5,834,912 | * 11/1998 | Nakamura et al. | 318/268 |

FOREIGN PATENT DOCUMENTS

| | | |
|---|---|---|
| 0 845 854 A1 | 6/1998 | (EP) . |
| 7-337057 | 12/1995 | (JP) . |
| 9-56183 | 2/1997 | (JP) . |

* cited by examiner

Primary Examiner—Robert E. Nappi
Assistant Examiner—Rita Leykin
(74) Attorney, Agent, or Firm—Armstrong, Westerman, Hattori, McLeland & Naughton, LLP

(57) ABSTRACT

A motor speed controller with high speed response characteristics. The controller comprises a proportional operating means, a means (1) which controls the angular velocity of a motor, an equivalent rigid body model (21) modelled in a primary delay system where the viscosity friction is handled as the time constant, a first compensating means (231) which carries out proportional operation, a second compensating means (232) which carries out integration, a means by which a motor torque signal outputted from the speed control means, the output of the first compensating means and the output of the second compensating means are added, and the sum is inputted to the equivalent rigid body model (21), and the differential signal between the speed signal of the speed control means and the output of the equivalent rigid body model is inputted to the first and second compensating means, and a means for defining the proportional gain of the first compensating means as the product of a first gain $\xi_s$ and a second gain $\omega_s$, the proportional gain of the second compensating means as the square of the second gain, and the second gain $\omega_s$ as the product of the proportional gain (Kv) of the proportional operating means and a preset band setting coefficient ($\alpha$). The output of the equivalent rigid body model is fed back to the speed control means (1) as a measured speed.

2 Claims, 4 Drawing Sheets

(INERTIA J = 1 TO BE ASSUMED)

(Do=0 TO BE ASSUMED IN AN EQUIVALENT RIGID BODY)

MOTOR SPEED CONTROLLER AND GAIN SETTING METHOD OF THE CONTROLLER

TECHNICAL FIELD OF THE INVENTION

The present invention is directed to a motor speed controller that enables a quick response, and a gain setting method of the controller.

BACKGROUND OF THE ART

A speed controller of an electric motor may be used for not only making a following action to a speed command but also making a high-speed positioning action by adding a position controlling loop outside a speed loop. It is essential that the speed controlling system is able to follow a speed command at a high speed and high accuracy. Hereinafter, prior arts pertaining to the abovementioned field of art are listed, and a description is given of features in each case.

(1) Motor speed controller which feeds back only speed signals resulting from a position differential In this art, if a proportional gain of the speed loop is increased to achieve a high speed response, high harmonic ripple components in the detecting speed is accordingly amplified to cause the torque wave form to be distorted, whereby such a problem occurs, where motor noise and vibrations are increased. Where an electric motor driven by the motor speed controller actuates a mechanism, distortion of the abovementioned torque waveform will become a source of vibration with respect to resonance elements of the mechanism and power transmitting system, or the existence of resonance characteristics may damage margin in stability of the control loop, whereby resonance noise occurs when driving the mechanism and the control system may be made unstable. Therefore, since the size of the proportional gain of the motor speed controller is limited due to distortion of the torque waveform and decrease in the allowance in stability of the controlling loop, such a problem occurs, by which the response characteristics of the speed-controlling system cannot be improved.

(2) Method for passing a speed-detected output through a low-pass filter

A method for passing a speed-detected output through a low-pass filter to decrease noise is considered in order to smoothen the torque waveform, wherein since the allowance in stability of the control loop is damaged by an increase in phase delay, the proportional gain of the speed-controlling system cannot be increased, and the response characteristics cannot be improved.

(3) Method for applying a same-dimensions (status) observer

It is considered that a same-dimensions (status) observer is concurrently applied in the speed-controlling system in order to smoothen the torque waveform and secure allowance in stability of the controlling system. Since the same-dimensions (status) observer is a prediction type, it can be easily imagined that speed signals having less phase delay can be outputted, and the speed signals can be achieved.

(4) Method for controlling vibrations by using an equivalent rigid body observer Japanese Patent Application No. 12785 of 1994 (Laid-Open Patent Publication No. 337057 of 1995) and Japanese Patent Application No. 233528 of 1995 (Laid-Open Patent Publication No. 56183 of 1997) exist as a means for increasing the proportional gain of the speed-controlling system, which drives a mechanism system influenced by mechanical resonance elements, with allowance in stability of the control loop secured. These are such that a control structure consisting of an equivalent rigid body observer, low-pass filter, high-pass filter and vibration controlling gain is added to the speed-controlling system.

Shortcomings and problems pertaining to the present invention are summarized as follows;

(a) Generally, even though a speed-controlling system is of a proportional plus integral type since a constant deviation occurs in detected signals due to disturbance such as Coulomb friction in the status observer, there is a problem in that the output of the speed controlling system is not coincident with the command speed. Therefore, usual status observers cannot be applied to the speed-controlling system as it is.

(b) In a motor speed controller using an equivalent rigid body observer, there are a number of parameters to be adjusted. It is necessary to add and adjust at least three parameters in total, such as a observer gain, time constants of low-pass filter and high-pass filter, and vibration controlling gain in addition to normal control parameters of the speed controlling system.

(c) There is no adjustment procedure for high-speed responses in the speed controlling system, or if any, the adjustment procedure is complicated. Thus, in the prior art, there are a number of parameters to be adjusted, whereby the adjustment procedure is complicated, and a problem occurs, in which no adjustment procedure is provided.

As a means for solving the above, by taking a larger observer gain than the gain of the speed controlling system, setting is determined so that the dynamic characteristics of the observer do not influence the dynamic characteristics of the speed controlling system, wherein there are many cases where adjustment of the controlling system is simplified.

(d) The speed controlling system, in which an observer is incorporated, is not constructed so that the response characteristics thereof can be easily improved. That is, in this case, since the cut-off frequency of the observer (as a filter) is high, the mechanical resonance components cannot be sufficiently reduced by the observer, whereby the proportional gain of the speed controlling system could not be increased (A detailed description is given later).

Based on the above consideration, it is therefore an object of the invention to provide a motor speed controller having a control structure by which the number of parameters to be adjusted may be reduced, and the proportional gain of the speed controlling system is increased, in a speed controlling system in which an equivalent rigid body observer (observer) is incorporated, and steps for adjusting so as to easily accelerate the speed response in the controlling system.

DISCLOSURE OF THE INVENTION

In the following description, the following reference symbols are defined as follows;

s: Laplacian operator
$\zeta_s$: Attenuation coefficient of an observer
$\omega_s$: Frequency band of an observer
Kv: Proportional gain
Cf(s): Transmission function of stabilizing compensator described later.

In order to solve the abovementioned shortcomings and problems, according to a first aspect of the invention, a motor speed controller comprising:

a speed-controlling means having a proportional operating means, which controls the angular velocity of a motor;

a modeled equivalent rigid body model in a first order lag system in which viscos friction is made into a time constant;

a first compensating means for carrying out a proportional operation;

a second compensating means for carrying out an integration operation;

a means for adding motor torque signals, outputted from the speed-controlling means, output of the first compensating means, and output of the second compensating means, inputting the sum thereof into the equivalent rigid body model, and inputting a differential signal obtained by subtracting the output of the equivalent rigid body model from the speed signals of the speed-controlling means into the first and second compensating means; and a means which defines a proportional gain of the first compensating means in terms of the product of the first gain ($\zeta_s$) and the second gain ($\omega_s$), defines an integration of the second compensating means in terms of a square of the second gain, multiplies the proportional gain (Kv) of the proportional operating means of the speed-controlling means by a band setting coefficient ($\alpha$) established in advance, and makes it into a feedback input to the second gain ($\omega_s$), wherein output of the equivalent rigid body model is made into a feedback input to the speed-controlling means as a detected speed.

Also, according to a second aspect of the invention, in addition to a motor speed controller as set forth in the first aspect, a gain setting method for the controller is featured in repeating the steps of taking the band setting coefficient as a value established in advance; increasing the proportional gain of a proportional operating means of the speed controlling means immediately up to the limit of oscillation of the speed controlling system; changing the band setting coefficient to a lower value than the value established in advance; and increasing the proportional gain of the proportional operating means of the speed controlling means immediately up to the limit of oscillation.

BRIEF DESCRIPTION OF THE DRAWINGS

FIGS. 1(a)–1(d) are block diagrams showing the principle of a motor speed controller according to the invention, wherein FIG. 1(a) illustrates a rigid body and a mechanical resonance system, FIG. 1(b) is a deformation of FIG. 1(a), FIG. 1(c) is a deformation of FIG. 1(b), and FIG. 1(d) is a deformation of the inside equivalent feedback loop of FIG. 1(c);

FIGS. 4(a)–4(c) are graphs showing the results of a computerized simulation in the preferred embodiment illustrated in FIG. 3, wherein FIG. 4(a) illustrates a state when the proportional gain is increased to initiate oscillation, FIG. 4(b) illustrates a state where an observer is used in the same conditions as those in FIG. 4(a), and FIG. 4(c) illustrates a state where the proportional gain is increased three times.

BEST MODE FOR CARRYING OUT THE INVENTION

Figure 1A:
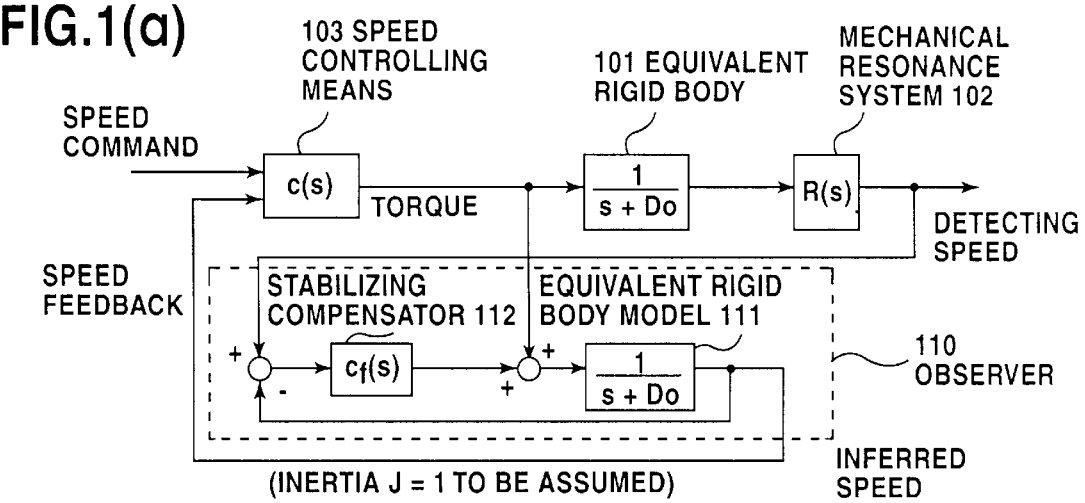
Figure 1B:
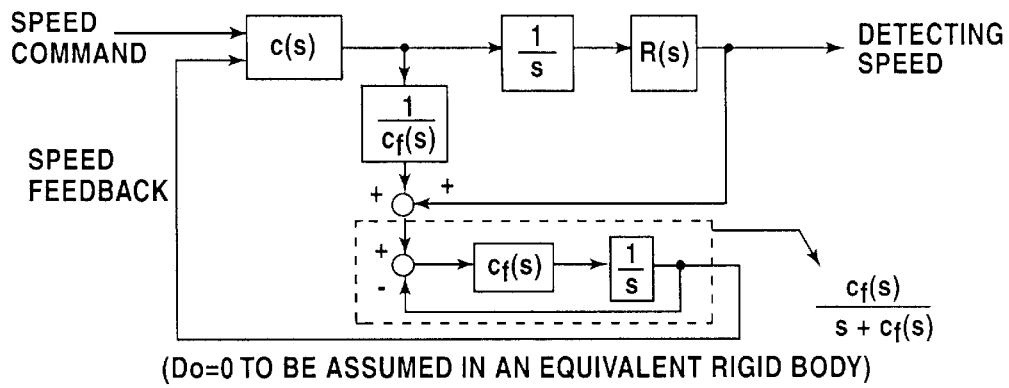
Figure 1C:
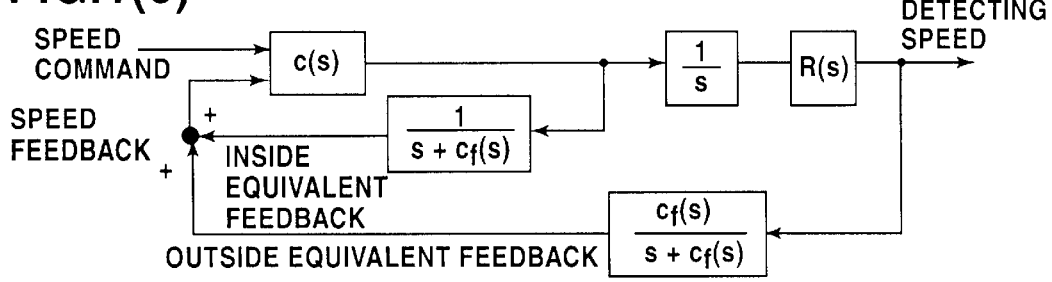

FIG. 1 is a block diagram showing the principle of a speed controller which will be the base of a motor speed controller, according to the invention. A subject to be controlled, which accompanies mechanical resonance, has already been filed by the same applicant of the invention as Japanese Laid-Open Patent Publication No. 337057 of 1995 and No. 56183 of 1997. It is expressed by block diagrams divided into an equivalent rigid body 101 and a mechanical resonance system 102, shown in FIG. 1(a). To simplify the drawing, it is assumed that the viscos friction of the motor is small and Do=0, and that the inertia is simplified to be J=1.

It is necessary to provide a same-dimension (status) observer having disturbance compensating performance on the basis of the above description. Therefore, in the invention, if an equivalent rigid body observer (Japanese Laid-Open Patent Publication No. 337057 of 1995) having disturbance compensating performance is used, an observer in which a detection speed and a torque command signal of the motor are used as inputs can be constructed so as to have such a structure as shown in FIG. 1(a). However, in the invention, differing from the art disclosed in the abovementioned laid-open patent, output of the equivalent rigid body model 111 of the equivalent rigid body observer 110 is fed back to the speed controlling system as a detected speed, whereby it is possible to construct a speed controlling system to which an equivalent rigid body observer is annexed using speed as an output. A stabilization compensator 112 of the observer can be expressed in terms of the following equation (1).

$$C_f(s) = 2\zeta_s\omega_s + \frac{\omega_s^2}{s} \tag{1}$$

Figure 2A:
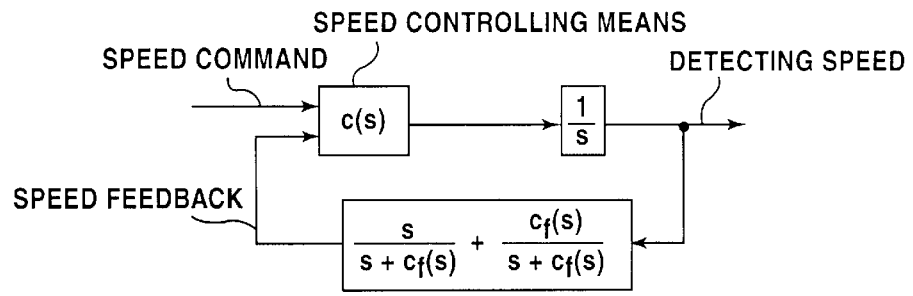
FIG. 2(a) is a block diagram conditionally equivalent to the block diagram shown in FIG. 1(d), FIG. 2(b) corresponds to a speed controlling means achieved by proportional control, FIG. 2(c) corresponds to a speed controlling means achieved by proportional plus integral control, and FIG. 2(d) corresponds to a speed controlling means achieved by integral plus proportional control.
Figure 2B:
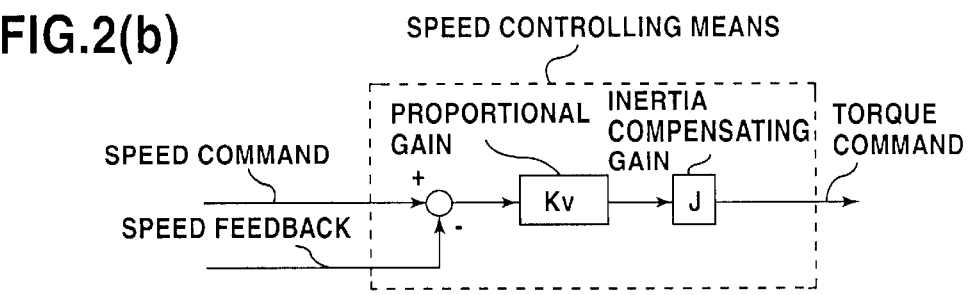
Figure 2C:
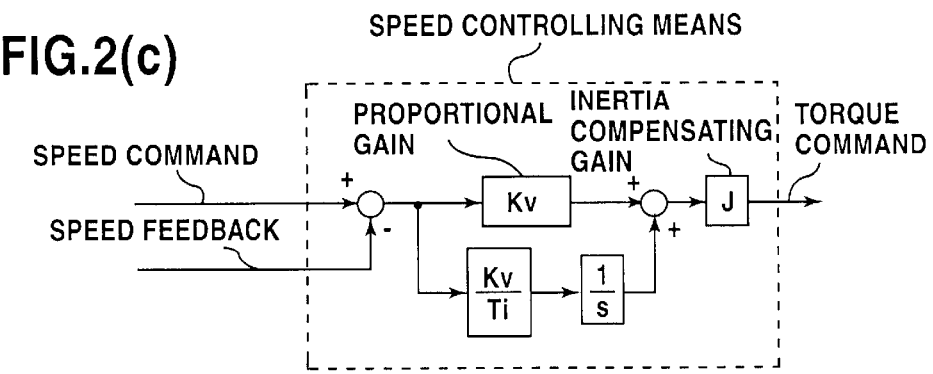

Speed controlling means 103 in FIG. 1(a) may receive inputs of a speed command and speed feedback and may output the torque of a motor, wherein no regulation is required in terms of structure. As some representatives thereof, respective control structures such as proportional control, proportional plus integral control and integral plus proportional control are illustrated in FIG. 2(a), FIG. 2(b) and FIG. 2(c).

Usually, if block diagrams are summarized to this level, no further deformation is carried out. However, in the present invention, in order to substantially comprehend the structure of a speed controlling system to which an equivalent rigid body observer 110 is annexed, the block diagrams are boldly further deformed.

The block diagram of FIG. 1(a) is further deformed in the order of 1(a), 1(b) and 1(c), and it can be found that the speed feedback pass can be divided into two equivalent feedback loops (outside and inside). The inside equivalent feedback loop in FIG. 1(c) may be further deformed as in FIG. 1(d).

Transmission function Gin(s) of the inside equivalent feedback loop becomes as in equation (2) based on the equation (1).

$$\frac{s}{s + C_f(s)} = \frac{s^2}{s^2 + 2\zeta_s\omega_s s + \omega_s^2} \tag{2}$$

Since the above equation is a multi-term expression in which all numerators consist of only terms of a square of s and denominators are of two dimensions of s, a block of Gin(s) is a high-pass filter.

A transmission function Gout(s) of the block of the outside equivalent feedback loop becomes the following expression (3).

$$\frac{C_f(s)}{s + C_f(s)} = \frac{2\zeta_s \omega_s s + \omega_s^2}{s^2 + 2\zeta_s \omega_s s + \omega_s^2} \tag{3}$$

Since the above expression is a multi-term expression in which the numerators are one-dimension of s, and denominators are two dimensions of s, the block of Gout(s) is a low-pass filter.

Figure 1D:
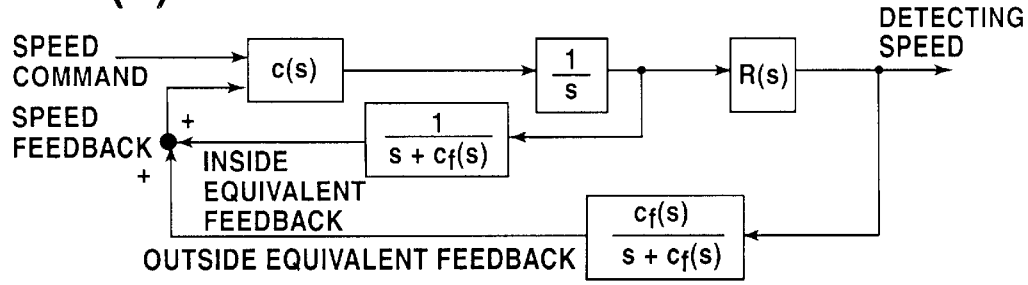

In order to take into consideration the abovementioned inside and outside equivalent feedback loop, an ideal state in which the rigidity of a load machine is high is taken into consideration in terms of FIG. 1(d). At this time, since it can be assumed that R(s)=1, the inside and outside equivalent feedback loop is summarized, the following expression (4) is established.

$$\frac{s}{s + C_f(s)} + \frac{C_f(s)}{s + C_f(s)} = 1 \tag{4}$$

Based on the expression (4), it is regarded that a speed controlling system in which the same-dimensions equivalent rigid observer shown in FIG. 1(a) is incorporated, equivalently has respective feedback loops at the outside which feeds back low-band components of a speed signal and at the inside which feeds back high-band components.

Generally, it has been found that stabilization of the speed controlling system depends on the phase characteristics of high harmonic bands of a controlling loop, and constant characteristics such as disturbance suppressing capacity depends on the gain characteristics of a low frequency band of the controlling loop. In FIG. 1(d), where the frequency band of a low-pass filter and a high-pass filter in the controlling loop is set to be lower than the target band in the speed controlling loop (by setting of $\omega_s$), the stability of controlling loop is determined by the inside loop, and the constant characteristics are determined by the outside loop. Since the inside loop does not pass through the mechanical resonance element R(s), the band of the high-pass filter is set to an optimal value by $\omega_s$, whereby the speed loop gain can be increased, and the target response characteristics of the speed controlling system can be improved. In conventional prior arts, since no such idea exists, which utilizes such characteristics of the observer incorporated controlling system, the frequency band of the observer was obscurely established wider than the frequency band of the controlling system. For example, the following expression (5) was employed.

$$\omega_s > 2K_V \tag{5}$$

In such a case, since almost no stabilizing action is created in the inside loop, only the outside loop must be used for simultaneously improving the stability and constant characteristics, wherein this is almost the same as in a case where no observer is used. That is, no advantage of the inside loop is utilized.

The present invention positively utilizes the inside and outside loops, and o, is determined by the following expression (6) using a band setting coefficient α in order to improve the response characteristics of a speed loop.

$$\omega_s = \alpha K_V \tag{6}$$

wherein the above ax is determined by the following expression (7).

$$\alpha < 1 \tag{7}$$

If so, the frequency band of the observer can be automatically set lower than the band (which is mostly determined by the speed loop gain Kv) being the target in the speed controlling loop, whereby it is possible to construct a controlling structure which can improve the response characteristics.

The observer $\zeta_s$ may be set to a suitable value from 0.7 through 2.0.

The abovementioned α is set to a suitable value in a range from 0.01 through 1.00, taking into consideration the rigidity of the machine, mechanical resonance frequency, and the target of the speed controlling system, etc. If the α is any value other than zero (0), the controlling system is stabilized, and the α can be set independently from setting of parameters of the stabilizing compensator of the speed controlling system, whereby the setting of parameters can be facilitated.

FIG. 2 is a block diagram conditionally equivalent to the block diagram of FIG. 1(d). A description is given below of reasons why the controlling system is stabilized even though the α is adequately established. R(s)=1 is assumed in order to consider the stability of the controlling system by only the observer, and the mechanical resonance is excluded, wherein the block linear diagram shown in FIG. 1(d) becomes as in FIG. 2(a). The transmission characteristics of a block in the speed feedback pass in FIG. 2 becomes like the following expression (8) on the basis of expressions (2), (3) and (6).

$$\frac{s}{s + C_f(s)} + \frac{C_f(s)}{s + C_f(s)} = \frac{s^2 + 2\zeta_s(\alpha K_v)s + (\alpha K_v)^2}{s^2 + 2\zeta_s(\alpha K_v)s + (\alpha K_v)^2} \tag{8}$$

In the expression (8), since the multi-term expression of the denominator is stable with respect to the abovementioned range $\zeta_s$ and the right side=1, the speed controlling loop is made stable with respect to the above ax being other than zero (0).

Figure 3:
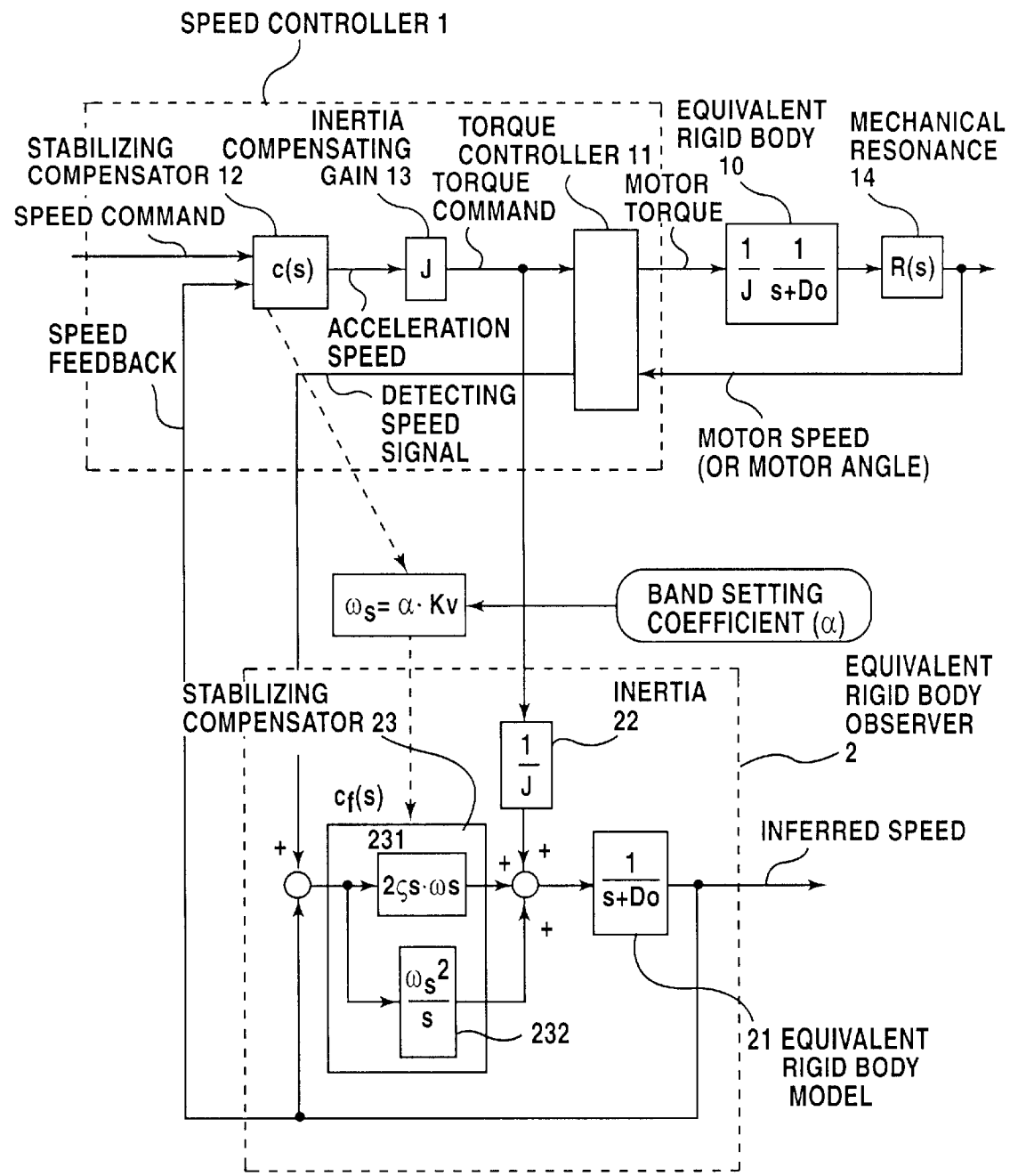
FIG. 3 is a block diagram pertaining to one preferred embodiment of a motor speed controller and a gain setting method of the controller according to the invention.

FIG. 3 is a block linear diagram pertaining to a motor speed controller of the invention and a gain setting method of the controller.

In the drawing, the motor speed controller 1 is a speed controlling system consisting of a torque controller 11, which has an electric motor (not illustrated) and a means for controlling the torque thereof, a stabilizing compensator 12, and an inertia compensating gain 13. 10 indicates an equivalent rigid body, J in the block indicates is the total inertia of the motor and load mechanism, Do is the viscos friction of the motor and load mechanism, and 14 indicates a mechanical resonance system.

Figure 2D:
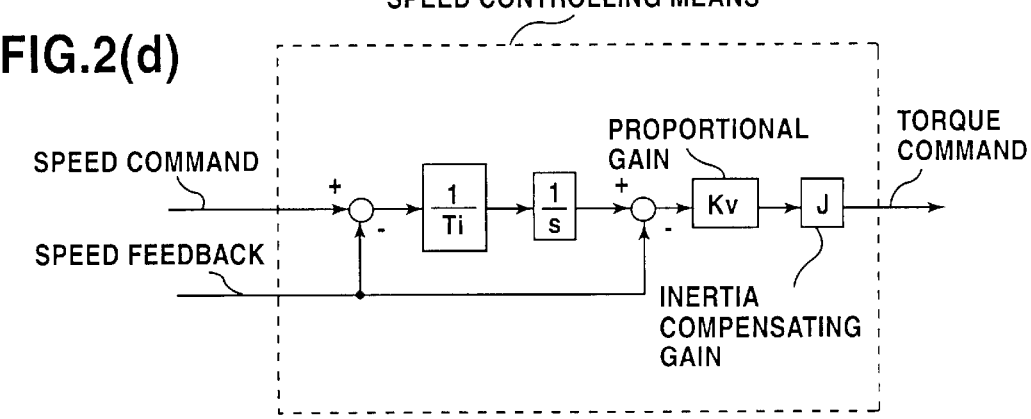

The abovementioned stabilizing compensator 12 receives the input of a speed command signal and a speed feedback signal and detects an acceleration signal. A torque command signal is outputted with the acceleration signal multiplied by an inertia compensation gain 13. Where the speed controlling system is constructed of proportional control (P control), the stabilizing compensator 12 is constructed of a subtraction block for subtracting a speed feedback signal from the speed command signal, and a proportional calculation element, and where the speed controlling system is constructed of proportional plus integral control (PI control), it is constructed of the abovementioned subtraction block, a proportional element and an integration element. In the case of integral plus proportional control (IP control), the stabilizing compensator is also composed of the abovementioned subtraction block, a proportional element, and an integral element. In each case, the proportional gain is Kv. (The structure of these compensators are illustrated in FIGS. 2(b), 2(c) and 2(d).

The torque controller 11 receives inputs of the torque command signals, controls the torque of a motor, and outputs a speed signal of the motor. Where the motor is provided with only an angle sensor, an angular velocity signal can be obtained by a differential calculation of the detected angle, and this signal can be outputted as a detected speed signal.

The equivalent rigid body observer 2 which is applied as a speed observer consists of an equivalent rigid body model 21, an inertia model 22 defined by the total inertia composed of an inertia of a motor and an inertia of a load, and a stabilizing compensator 23 of the observer.

The stabilizing compensation 23 of the observer is composed of a proportional calculation means 231 being the first compensating means, and an integral calculation means 232 being the second compensating means.

The gain of the proportional calculation means 231 is defined by the product which is two times the product of $\zeta_s$ being the first gain and $\omega_s$ being the second gain, and the gain of the integral calculation means is defined by the square of $\omega_s$. $\zeta_s$ is an attenuation constant of the observer. The frequency band $\omega_s$ of the observer is defined by the product of a band setting coefficient $\alpha$ and a proportional gain Kv of the speed controlling system.

With respect to the speed observer, since values of the motor model 21, total inertia model 22 and attenuation constant $\zeta_s$ of the observer can be established in advance, there is only one parameter to be adjusted, which is a band setting coefficient $\alpha$. That is, only the band setting coefficient $\alpha$ may be adjusted in addition to the respective control parameters of the speed controlling system.

Next, a description is given of an example of the gain adjusting procedure.

An adjustment procedure example is described below, by which the proportional gain (Kv) of the proportional calculation means of the abovementioned speed controlling means is increased by adjusting the band setting coefficient $\alpha$.

Step 1: The band setting coefficient ($\alpha$) is determined to a predetermined value.

Step 2: The proportional gain (Kv) of the proportional calculation means of the abovementioned speed controlling means is increased immediately up to the limit of oscillation (the limit when oscillation is initiated) of the speed controlling system.

Step 3: The band setting coefficient ($\alpha$) is changed to a value lower than the predetermined value.

Step 4: The proportional gain (Kv) of the proportional calculation means of the speed controlling means is increased immediately up to the limit of oscillation (the limit when oscillations are initiated) of the speed controlling system.

Step 5: By repeating the steps 3 and 4, the proportional gain (Kv) of the proportional calculation means of the speed controlling means is increased greater than the limit value of the step 2.

FIG. 4 is an explanatory view showing the results of a computer simulation in a preferred embodiment, shown in FIG. 3, of a motor speed controller and a gain setting method of the controller according to the invention. In order to simplify the drawing, the speed controlling system is made into a proportional system and the speed command is of linear acceleration waveform.

Figure 4A:
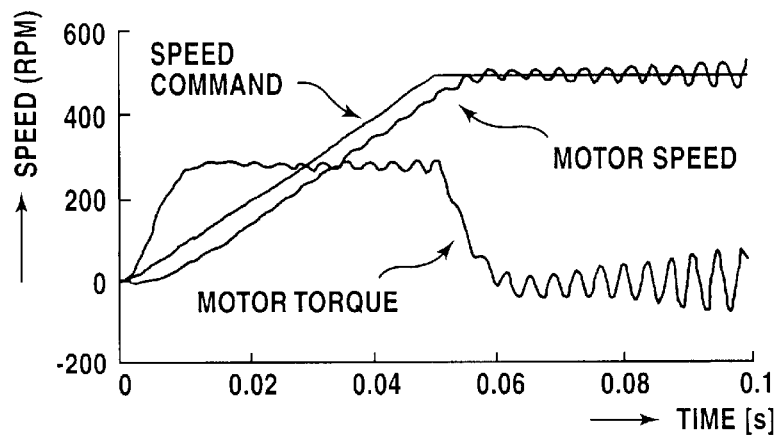

FIG. 4(a) shows a case where the proportional gain of the speed controlling means is set to a value (Kv=188[1/s]) at which oscillation is initiated, wherein oscillation in the torque waveform of a motor and the speed waveform thereof grow and the speed controlling means cannot be used as a speed controller. The following performance of the speed command cannot be increased more than the above value.

Figure 4B:
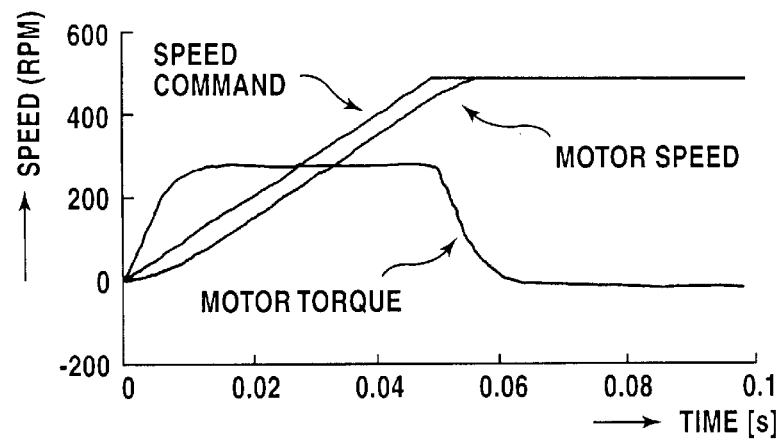

FIG. 4(b) shows a case where the equivalent rigid body observer is incorporated as a speed inferring unit in a state where the respective control gains (Kv=188[1/s]) of the speed controlling means remains unchanged, wherein oscillation of the torque waveform and speed waveform of the motor are eliminated, and the speed controlling means can be used with allowance. Therefore, it is expected that the performance following the speed commands can be improved. The band setting coefficient ($\alpha$) is determined at 10%, and as in the description of the principle of the invention, it is found that the stability of control has been recovered by lowering the band setting coefficient.

Figure 4C:
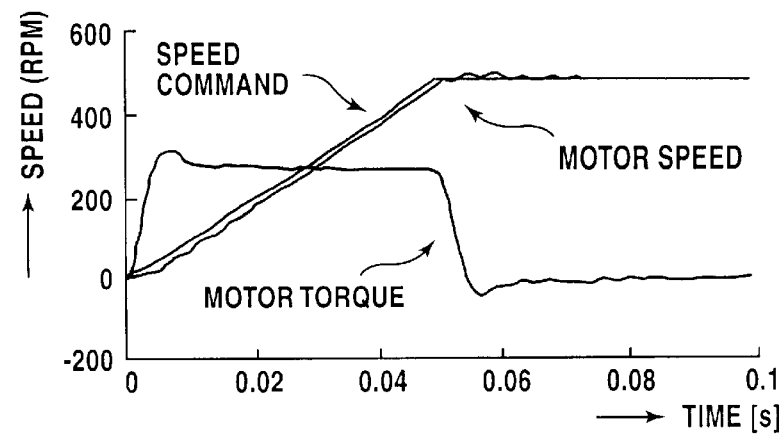

FIG. 4(c) shows a case where only the proportional gain of the speed controlling means is changed from 188[1/s] to 565[1/s], that is, increased three times, with the band setting coefficient remaining at ($\alpha$=10%) in a state where the equivalent rigid body observer is incorporated as a speed inferring unit.

Since in the speed controlling means oscillation is quickly attenuated, it can be used as a speed controller. In this case, it is found that the performance following speed commands has been remarkably improved in comparison with the case shown in FIG. 4(a). By a very simple adjustment in which the band setting coefficient is lowered, the proportional gain (Kv) of the speed controlling means is easily increased three times, wherein it can be understood that the object of the invention has been sufficiently achieved.

As already described above, according to the invention, in a speed controller which drives a machine, since an effect can be brought about, by which the proportional gain in the speed controller can be increased while suppressing the occurrence of mechanical resonance, the command-following performance of the speed controller can be remarkably improved.

In particular, according to the results of the simulation of the invention, a remarkable effect can be brought about, by which the proportional gain can be improved three times by simple gain adjustment regardless of the existence of mechanical resonance.

Further, in a speed controlling system in which an equivalent rigid body observer is incorporated, the number of parameters to be adjusted is only one, that is, only the band setting coefficient, in addition to control parameters to be adjusted as the speed controller (In the prior arts, at least two parameters were required).

Therefore, as the proportional gain of the speed controlling means is increased by lowering the band setting coefficient, an effect can be brought about, by which a detailed adjustment procedure, which can easily quicken the speed response in the controller, can be proposed, and furthermore, since the adjustment is simple, another effect can be brought about, by which a speed controller having high performance over a wide range can be produced.

Industrial Applicability

When an electric motor driven by an motor speed controller drives a mechanism, the present invention is applicable where the proportional gain is increased while suppressing mechanical resonance, and the ability to follow high speed commands is required.

What is claimed are:

1. A motor speed controller comprising:

a speed-controlling means having a proportional operating means, which controls the angular velocity of a motor;

a modeled equivalent rigid body model in a first order lag system in which viscos friction is made into a time constant;

a first compensating means for carrying out a proportional operation;

a second compensating means for carrying out an integration operation;

a means for adding torque signals of a motor, outputted from the speed-controlling means, output of the first compensating means, and output of the second compensating means, inputting the sum thereof into the equivalent rigid body model, and for inputting a differential signal obtained by subtracting the output of the equivalent rigid body model from the speed signals of the speed-controlling means into the first and second compensating means; and a means which defines a proportional gain of the first compensating means in terms of the product of the first gain ($\zeta_s$) and the second gain ($\omega_s$), defines an integration of the second compensating means in terms of a square of the second gain, multiplies the proportional gain (Kv) of the proportional operating means of the speed-controlling means by a band setting coefficient ($\alpha$) established in advance, and makes it into a feedback input to the second gain ($\omega_s$), wherein output of the equivalent rigid body model is made into a feedback input to the speed-controlling means as a detected speed.

2. A gain setting method of the motor speed controller as set forth in claim 1, comprising the steps of:

setting said band setting coefficient to a predetermined value;

increasing a proportional gain of a proportional operating means of the speed controlling means immediately up to the limit of oscillation of the speed controlling system;

changing the band setting coefficient to a lower value than the value established in advance;

increasing the proportional gain of the proportional operating means of the speed controlling means immediately up to the limit of oscillation, and repeating said steps.

* * * * *